United States Patent
Song et al.

(10) Patent No.: US 11,656,893 B2
(45) Date of Patent: May 23, 2023

(54) CONTAINER DOCKERFILE AND CONTAINER MIRROR IMAGE QUICK GENERATION METHODS AND SYSTEMS

(71) Applicant: GENETALKS BIO-TECH (CHANGSHA) CO., LTD., Hunan (CN)

(72) Inventors: Zhuo Song, Hunan (CN); Gen Li, Hunan (CN); Xu Zhou, Hunan (CN); Chouxian Ma, Hunan (CN); Chenglong Xie, Hunan (CN); Kan Wu, Hunan (CN); Zhaohui Sun, Hunan (CN); Xiali Xu, Hunan (CN); Chungen Yi, Hunan (CN); Yao Yang, Hunan (CN); Lixia Zhao, Hunan (CN); Wenfei Ning, Hunan (CN); Jun Chuan, Hunan (CN); Junxiang Tang, Hunan (CN); Delong Zhu, Hunan (CN); Haibo Mao, Hunan (CN); Yanhuang Jiang, Hunan (CN); Yanfei Li, Hunan (CN)

(73) Assignee: GENETALKS BIO-TECH (CHANGSHA) CO., LTD., Hunan (CN)

( * ) Notice: Subject to any disclaimer, the term of this patent is extended or adjusted under 35 U.S.C. 154(b) by 541 days.

(21) Appl. No.: 16/618,402

(22) PCT Filed: Nov. 21, 2018

(86) PCT No.: PCT/CN2018/116558
§ 371 (c)(1),
(2) Date: Dec. 2, 2019

(87) PCT Pub. No.: WO2019/153829
PCT Pub. Date: Aug. 15, 2019

(65) Prior Publication Data
US 2020/0293354 A1 Sep. 17, 2020

(30) Foreign Application Priority Data

Feb. 12, 2018 (CN) .................. 201810145672.X

(51) Int. Cl.
*G06F 9/455* (2018.01)
*G06F 8/61* (2018.01)
(Continued)

(52) U.S. Cl.
CPC ............ *G06F 9/45558* (2013.01); *G06F 8/63* (2013.01); *G06F 9/485* (2013.01); *G06F 9/54* (2013.01)

(58) Field of Classification Search
CPC ........ G06F 8/63; G06F 9/45558; G06F 9/485; G06F 9/54
See application file for complete search history.

(56) References Cited

U.S. PATENT DOCUMENTS

| | | | | |
|---|---|---|---|---|
| 9,367,305 | B1 * | 6/2016 | Kumar | G06F 8/71 |
| 10,146,599 | B2 * | 12/2018 | Bellomo | G06F 9/45558 |
| 10,572,294 | B1 * | 2/2020 | Chawda | G06F 9/44505 |
| 10,579,355 | B2 * | 3/2020 | Bo | G06F 8/60 |

(Continued)

FOREIGN PATENT DOCUMENTS

| | | |
|---|---|---|
| CN | 104991815 | 10/2015 |
| CN | 108415795 | 8/2018 |

OTHER PUBLICATIONS

Bottiger et al., "An Introduction to Rocker: Docker Containers for R", published by The R Journal: article published in 2017, vol. 9:2, pp. 1-10 (Year: 2017).*

(Continued)

*Primary Examiner* — S. Sough
*Assistant Examiner* — Zheng Wei
(74) *Attorney, Agent, or Firm* — JCIP Global Inc.

(57) ABSTRACT

The invention discloses a container Dockerfile and container mirror image quick generation methods and systems. The (Continued)

container Dockerfile quick generation method includes the steps of for a to-be-packaged target application, running and performing tracking execution on the target application, and recording operation system dependencies of the target application in the running process; organizing and constructing a file list required for packaging the target application to a container mirror image; and according to the file list required for packaging the target application to the container mirror image, generating a Dockerfile and container mirror image file creation directory used for packaging the target application to the container mirror image. Any target application can be automatically packaged by the invention to a container; the construction of an executable minimal environmental closure of the target application is finished; the packaged container is smaller than a manually made container.

15 Claims, 2 Drawing Sheets

(51) Int. Cl.
*G06F 9/48* (2006.01)
*G06F 9/54* (2006.01)

(56) References Cited

U.S. PATENT DOCUMENTS

| | | | | |
|---|---|---|---|---|
| 11,113,090 | B1* | 9/2021 | Wilkinson | G06F 9/5077 |
| 2009/0119493 | A1* | 5/2009 | Venkitachalam | G06F 9/45558 |
| | | | | 718/1 |
| 2010/0161875 | A1* | 6/2010 | Chang | G06F 9/4552 |
| | | | | 718/1 |
| 2016/0019056 | A1* | 1/2016 | Rohan | G06F 8/70 |
| | | | | 717/123 |
| 2017/0083544 | A1* | 3/2017 | Alton | G06F 8/60 |
| 2018/0088973 | A1* | 3/2018 | Subhraveti | G06F 8/60 |

OTHER PUBLICATIONS

Dan Tehranian, How Should I Get Application Configuration into my Docker Containers? retrieved from Dan Tehranian's Blog < https://dantehranian.wordpress.com/2015/03/25/how-should-i-get-application-configuration-into-my-docker-containers>, published on Mar. 25, 2015, pp. 1-9 (Year: 2015).*
Ellexus, "breeze dockerfile generator user manual 2.12.0," Dec. 31, 2017, Available at: https://www.ellexus.com/wp-content/uploads/2018/06/BreezeDockerGenUserManual_2.12.0-1.pdf.
Anonymous, "strace command, tracing system call and library dependency," Sep. 28, 2016, Available at: https://blog.csdn.net/a2796749/article/details/52686655.
"International Search Report (Form PCT/ISA/210) of PCT/CN2018/116558," dated Feb. 22, 2019, with English translation thereof, pp. 1-4.

* cited by examiner

CONTAINER DOCKERFILE AND CONTAINER MIRROR IMAGE QUICK GENERATION METHODS AND SYSTEMS

CROSS-REFERENCE TO RELATED APPLICATION

This application is a 371 of international application of PCT application serial no. PCT/CN2018/116558, filed on Nov. 21, 2018, which claims the priority benefit of China application no. 201810145672.X, filed on Feb. 12, 2018. The entirety of each of the above mentioned patent applications is hereby incorporated by reference herein and made a part of this specification.

TECHNICAL FIELD

The invention relates to container generation and cloud computing technology, specifically to a container Dockerfile and container mirror image quick generation methods and systems, used for meeting the demands of the existing application software on migration toward cloud computing platform.

BACKGROUND

With the era of "big data, IoT, mobile Internet and cloud computing" coming, the new generation of programmable cloud computing environment customized as required, managed in a centralized and unified manner, supervised by dynamic flow and deployed automatically brings fundamental changes to production, living and business models. More and more enterprises have constructed their own private clouds or adopted cloud services of third party providers, migrated and deployed own traditional business systems to cloud platforms, in order to construct new business models and reduce service and operation & maintenance costs. The container technology is an effective technology coping with this demand.

The container technology uses the concept of standard container for reference. Container boxes are used for transporting goods, while containers are used for transporting software. Each container contains a software mirror image, i.e., "goods" in the container, and like real goods, the software mirror image in the container can be subjected to some operations. For example, the mirror image may be created, started, closed, restarted and destroyed. Like the container box, the container performs the above operation, no matter what is filled in the container, whether it is a Web server or database, or an application server inside. All containers are "filled" with contents in the same manner. Containers do not care about where containers are transported: you can construct a container in your own notebooks, upload to Registry, then download to a physical or virtual server for testing, and finally deploy the container into the cluster of Amazon EC2 host. Like the standard container, the container is replaced quickly, easily distributed, commonly used as far as possible, and can be overlaid. Using the container, we can quickly construct an application server, a message bus, a set of utility tools, a continuous integration (CI) test environment or any application, service or tool. We can locally construct a complete test environment, and can also copy a set of complicated application stacks for production or development.

The container itself has the features of "standard" and "isolation", very suitable for creating components for services. Some application scenarios of the container are as follows.

Local development and construction flow are accelerated, to make it more efficient and more lightweight. Local developers may construct, run and share containers. Containers can be constructed in the development environment, then delivered to the test environment easily, and finally put into the production environment.

Independent services or applications can provide the same operation result in different environments. This is particularly practical in deployment of service-oriented architecture and heavily relied on micro service.

An isolated environment is created with the container for testing. For example, a container used for testing is started with a continuous integration tool, like Jenkins CI.

Containers enable developers to locally construct a complicated program or architecture for testing first, not deployment or testing in the production environment in the beginning.

A multi-user platform is constructed, i.e., service (PaaS) infrastructure.

A lightweight independent sandbox environment is provided for development and testing, or an independent sandbox environment is used for technical teaching, such as use of Unix shell, programming language teaching.

Software, i.e., service (SaaS) application is provided, such as Memcached.

High-performance, ultra-large-scale host deployment.

What a container operation system provides is a technology which effectively divides operation system resources into multiple mutual groups, in order to better balance usage requirements of conflicting resources among isolated groups. Through provision of a way of creating and entering a container, the operation system enables the application to run like on an independent machine, but also share many resources at the bottom layer. Compared with the virtualization technology, the container is a lightweight resource isolation way whose expenditure is much smaller.

There are two steps of constructing and generating a container mirror image for a specific application: (1) analyzing dependency relationships of the application, and collecting the operation system, other software packages and configuration information relied on by this application; (2) packaging the software package and configuration information relied on by this application together with this application in a specific operation system container mirror image. In this process, the second step is simpler, and can be completed by the following two ways: 1. manually starting a container example of a basic mirror image containing a basic system (such as: ubuntu:16.04, centos:7), then manually downloading or copying data required by this application and executable program to the container example, and finally submitting the container example as a container mirror image; 2. constructing a basic command step of this specific application using Dockerfile description, then install the described running step using docker build command, and finally completing construction of the mirror image. The real difficulty is the first step of constructing and generating a container mirror image for the specific application software. At present, developers obtain dependency relationships of the application software through manual analysis, and then write these dependency relationships in Dockerfile. However, manual analysis needs constructors to know the dependency relationships between the specific application and other system software well, so that an application can be moved to a container with clear steps. In actual life, there are a lot of historical programs left over in enterprises, and almost no person knows the dependency relationships of this application on the system environment due to mobilization of developers and other many reasons. Forced migration needs a lot of tests for the dependency of this application on other system libraries, etc., consequently to greatly increase the difficulty in application of containerization.

SUMMARY

The technical problem to be solved by the present invention: For the above problems of the prior art, a container Dockerfile and container mirror image quick generation methods and systems are provided. The present invention performs tracking execution by comprehensively using the target application, and analyzes the complex dependency in the running process so that the target application completes a real execution in an environment monitored transparently, then automatically organizes and generates all files required by construction of the container mirror image for the target application and automatically generates Dockerfile scripts according to the analysis for the dependencies on each library, data, other executable programs in the system during the real execution of the target application, consequently to package the target application in a container mirror image, so that the existing target applications deployed in the system can be packaged to generate Dockerfile or further generate a container mirror image, consequently to automatically package any target application to a container.

To solve the above technical problem, the technical solution applied by the present invention is as follows:

A container Dockerfile quick generation method, comprising the steps of:

1) For a to-be-packaged target application, running the target application and performing tracking execution on the target application, and recording operation system dependencies of the target application in the running process;

2) Organizing and constructing a file list required for packaging the target application to a container mirror image according to the operation system dependencies;

3) According to the file list required for packaging the target application to the container mirror image, generating a Dockerfile and container mirror image file creation directory used for packaging the target application to the container mirror image.

Preferably, step 1) of running the target application and performing tracking execution on the target application specifically refers to isolating the target application in an independent operation system process space for running; the system call in this independent operation system process space is the sole channel for the target application to exchange without the outside, and all system calls of the target application are monitored.

Preferably, step 1) comprises the following detailed steps:

1.1) For a to-be-packaged target application, isolating the target application in an independent operation system process space; the system call in this independent operation system process space is the sole channel for the target application to exchange without the outside, and all system calls of the target application are monitored; initializing running parameters for generating the target application, running the target application based on running parameters and performing a round of iterative tracking execution on the target application;

1.2) Collecting environment variables and environment variable values required for running the target application, and adding environment variable dependencies of the target application to the operation system dependencies in the running process;

1.3) Monitoring the system call in the running process of the target application; the executive body of the system call includes a target application itself, a process created by the target application through process-created system call, a system call of the target application for local inter-process communication and a process of restarting after sharing system calls of the kernel object kind; the system call type includes a file-involved system call, a process-created system call, a local inter-process communication system call, a system call for sharing kernel objects; when the target application performs the local inter-process communication system call and the system call for sharing kernel objects, it first acquires the starting parameters of the called process, kills called process and restarts the called process based on the acquired starting parameters in a program tracking mode; it finally records the file dependencies of the file corresponding to system call of the file added to the operation system dependencies, process dependencies of the process created by the process-created system call added to the operation system dependencies, and communication process dependencies of the process involving local inter-process communication system call and system call sharing kernel objects added to the operation system dependencies;

1.4) Judging whether the target application ends operation or the operation time exceeds the preset time threshold, if the target application ends operation or the operation time exceeds the preset time threshold, jumping to the next step;

1.5) Judging whether the operation system dependencies obtained by this round of tracking execution are added with new items, if yes, changing running parameters of the target application, running the target application based on the running parameters and performing the next round of iterative tracking execution for the target application, jumping to the step 1.2); otherwise, jumping to the step 2).

Preferably, the step 1.2) of collecting environment variables and environment variable values required for running the target application specially refers to at least one of method (1) and method (2): method (1), recording current visible environment variables and environment variable values before execution of the target application, as environment variable dependencies in operation system dependencies; method (2), during execution of the target application, calling the function of monitoring getenv standard library functions, recording environment variables and environment variable values obtained from calling the function of monitoring getenv standard library functions by the target application, as the environment variable dependencies in operation system dependencies.

Preferably, the file-involved system call in step 1.3) includes: No. 2 sys_open function call, No. 4 sys_stat function call, No. 6 sys_lstat function call, No. 21 sys_access function call, No. 59 sys_execve function call, No. 127 sys_statfs function call, No. 188 sys_setxattr function call, No. 189 sys_lsetxattr function call, No. 191 sys_getxattr function call, No. 192 sys_lgetxattr function call, No. 195 sys_listxattr function call, No. 196 sys_llistxattr function call; the process-created system call in step 1.3) includes: No. 56 sys_clone function call, No. 57 sys_fork function call, No. 58 sys_vfork function call; the local inter-process communication system call in step 1.3) includes: No. 22 sys_pipe function call, No. 293 sys_pipe2 function call, No. 62 sys_kill function call, No. 42 sys_connect function call, No. 43 sys_accept function call, No. 299 sys_recvmmsg function call, No. 307 sys_sendmmsg function call; the system call for sharing kernel objects in step 1.3) includes: No. 30 sys_shmat function call, No. 31 sys_shmctl function call, No. 9 sys_mmap function call.

Preferably, when running the target application and performing tracking execution on the target application in step 1), the method for performing tracking execution on the target application is one of three methods: dynamic binary translation, process debugging and dynamic link library hijack.

Preferably, step 2) comprises the following detailed steps:

2.1) combining all operation system dependencies into one file;

2.2) deleting duplicate items from the combined file;

2.3) deleting non-dependencies from the combined file; the non-dependencies includes new file items to be created in file dependencies of operation system dependencies when the target application is executed in a new container mirror image environment;

2.4) deleting items unnecessarily to be reconstructed in the target container mirror image for file dependencies in operation system dependencies of the combined file, and finally obtaining a file list required for packaging the target application to a container mirror image.

Preferably, step 3) comprises the following detailed steps:

3.1) initializing and creating Dockerfile and container mirror image file creation directory;

3.2) traversing and selecting one of dependencies as the current dependency for the file list required for packaging the target application to a container mirror image;

3.3) Judging the type of the current dependency: if the type of the current dependency is an environment variable, adding one statement of setting the environment variable of the current dependency in Dockerfile; if the type of the current dependency is a file, creating a same directory structure as the original directory structure of the file of the current dependency under the container mirror image file creation directory, and copying the file of the current dependency to the same directory structure under the container mirror image file creation directory; if the type of the current dependency is a symbolic link, recursively traverse the file pointed by the symbolic link until the file pointed finally by the link is a conventional file, reconstructing a completely same symbolic link structure in Dockerfile according to the pointing relations between symbolic links, and creating a same directory structure as the original directory structure of the file pointed finally by the symbolic link under the container mirror image file creation directory, then copying the file pointed finally by the symbolic link to the same directory structure under the container mirror image file creation directory;

3.4) Judging whether the file list required for packaging the target application to a container mirror image is traversed, if not, traversing and selecting the next item as the current item, and jumping to step 3.3); otherwise ending and exiting.

The present invention further provides a container mirror image quick generation method, comprising the following implementation steps:

S1) For the target application, generating a Dockerfile and container mirror image file creation directory used for packaging the target application to the container mirror image by using the container Dockerfile quick generation method of the present invention;

S2) Based on the existing basic container mirror image, generating a container mirror image on the target host from Dockerfile and container mirror image file creation directory through docker build command, consequently to package the target application to the container mirror image.

The present invention further provides a container mirror image quick generation system, comprising a computer system, wherein the computer system is programmed to perform the steps of the container Dockerfile quick generation method or the steps of the container mirror image quick generation method in the present invention.

The present invention has the following beneficial effects:

1. The present invention performs tracking execution by comprehensively using the target application, and analyzes the complex dependency in the running process so that the target application completes a real execution in an environment monitored transparently, then automatically organizes and generates all files required by construction of the container mirror image for the target application and automatically generates Dockerfile scripts according to the analysis for the dependencies on each library, data, other executable programs in the system during the real execution of the target application, consequently to package the target application in a container mirror image, so that the existing target applications deployed in the system can be packaged to generate Dockerfile or further generate a container mirror image, consequently to automatically package any target application to a container.

2. Due to the complexity of interaction with the operation system and other processes in the system when the process is running, this automated packaging process cannot complete the packaging task through extracting the file name opened by this process. The present invention completely and fully considers various possible interaction behaviors of a process in the system, completes construction of an executable minimal environmental closure of the target application through the tracking process during continuous iterative running, and packages a container smaller than that hand-made.

3. The automation method of packaging to a container in the present invention is more convenient and quicker than the manual packaging method.

4. The present invention does not need an operator to deeply know components of the application; and any person can easily containerize wanted specific applications.

DETAILED DESCRIPTION

Embodiment 1

Figure 1:
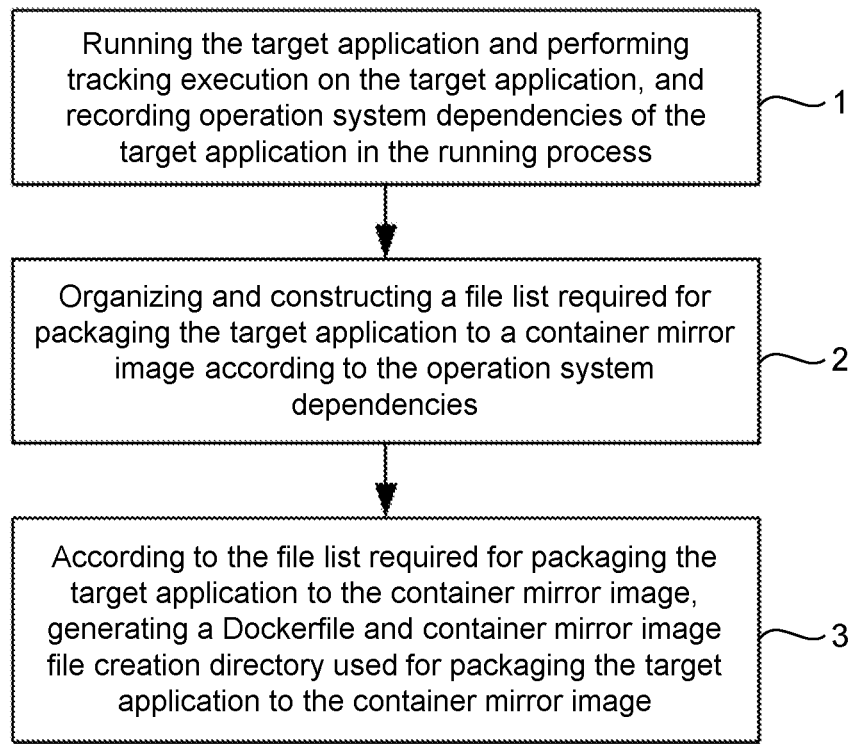
FIG. 1 is a basic flow diagram of the method in embodiment 1 of the present invention.

As shown in FIG. 1, the container Dockerfile quick generation method of this embodiment comprises the following implementation steps:

1) For a to-be-packaged target application, running the target application and performing tracking execution on the target application, and recording operation system dependencies of the target application in the running process;

2) Organizing and constructing a file list required for packaging the target application to a container mirror image according to the operation system dependencies;

3) According to the file list required for packaging the target application to the container mirror image, generating a Dockerfile and container mirror image file creation directory used for packaging the target application to the container mirror image.

In this embodiment, step 1) of running the target application and performing tracking execution on the target application specifically refers to isolating the target application in an independent operation system process space for running; the system call in this independent operation system process space is the sole channel for the target application to exchange without the outside, and all system calls of the target application are monitored.

In this embodiment, when running the target application and performing tracking execution on the target application in step 1), the method for performing tracking execution on the target application is one of three methods: dynamic binary translation, process debugging and dynamic link library hijack.

Figure 2:
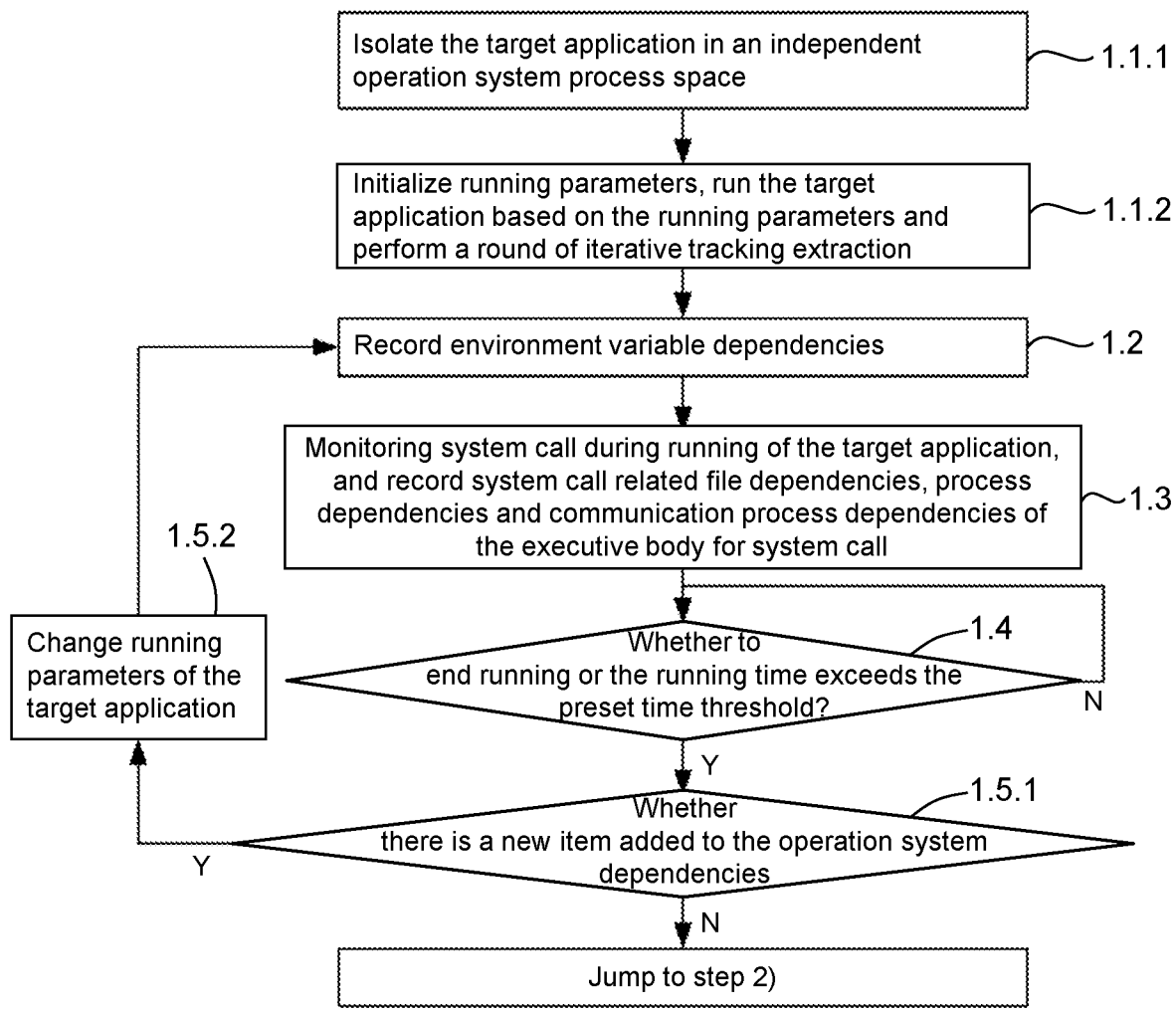
FIG. 2 is a detailed flow diagram of acquiring operation system dependencies in embodiment 1 of the present invention.

As shown in FIG. 2, in this embodiment, step 1) comprises the following detailed steps:

1.1.1) For a to-be-packaged target application, isolating the target application in an independent operation system process space; the system call in this independent operation system process space is the sole channel for the target application to exchange without the outside, and all system calls of the target application are monitored; 1.1.2) initializing running parameters for generating the target application, running the target application based on running parameters and performing a round of iterative tracking execution on the target application;

1.2) Collecting environment variables and environment variable values required for running the target application, and adding environment variable dependencies of the target application to the operation system dependencies in the running process;

1.3) Monitoring the system call in the running process of the target application; the executive body of the system call includes a target application itself, a process created by the target application through process-created system call, a system call of the target application for local inter-process communication and a process of restarting after sharing system calls of the kernel object kind; the system call type includes a file-involved system call, a process-created system call, a local inter-process communication system call, a system call for sharing kernel objects; when the target application performs the local inter-process communication system call and the system call for sharing kernel objects, it first acquires the starting parameters of the called process, kills called process and restarts the called process based on the acquired starting parameters in a program tracking mode; it finally records the file dependencies of the file corresponding to system call of the file added to the operation system dependencies, process dependencies of the process created by the process-created system call added to the operation system dependencies, and communication process dependencies of the process involving local inter-process communication system call and system call sharing kernel objects added to the operation system dependencies;

1.4) Judging whether the target application ends operation or the operation time exceeds the preset time threshold, if the target application ends operation or the operation time exceeds the preset time threshold, jumping to the next step;

1.5.1) Judging whether the operation system dependencies obtained by this round of tracking execution are added with new items, if yes, to the step 1.5.2), changing running parameters of the target application, running the target application based on the running parameters and performing the next round of iterative tracking execution for the target application, jumping to the step 1.2); otherwise, jumping to the step 2) of FIG. 1.

As can be seen from the above that, the environment variable dependencies include environment variable dependencies, file dependencies, process dependencies and communication process dependencies, wherein the file dependencies, process dependencies and communication process dependencies may be software packages, software libraries, operation system services, processes, files, symbolic links, etc. and they, in essence, are depended files.

In this embodiment, the step 1.2) of collecting environment variables and environment variable values required for running the target application specially refers to at least one of method (1) and method (2): method (1), recording current visible environment variables and environment variable values before execution of the target application, as environment variable dependencies in operation system dependencies; method (2), during execution of the target application, calling the function of monitoring getenv standard library functions, recording environment variables and environment variable values obtained from calling the function of monitoring getenv standard library functions by the target application, as the environment variable dependencies in operation system dependencies.

In this embodiment, 1.3) monitoring system call during running of the target application is added with monitoring all file processing related system calls in syscall_entry function. The file-involved system call in step 1.3) includes: No. 2 sys_open function call, No. 4 sys_stat function call, No. 6 sys_Istat function call, No. 21 sys_access function call, No. 59 sys_execve function call, No. 127 sys_statfs function call, No. 188 sys_setxattr function call, No. 189 sys_lsetxattr function call, No. 191 sys_getxattr function call, No. 192 sys_lgetxattr function call, No. 195 sys_listxattr function call, No. 196 sys_llistxattr function call; the process-created system call in step 1.3) includes: No. 56 sys_clone function call, No. 57 sys_fork function call, No. 58 sys_vfork function call; the local inter-process communication system call in step 1.3) includes: No. 22 sys_pipe function call, No. 293 sys_pipe2 function call, No. 62 sys_kill function call, No. 42 sys_connect function call, No. 43 sys_accept function call, No. 299 sys_recvmmsg function call, No. 307 sys_sendmmsg function call; the system call for sharing kernel objects in step 1.3) includes: No. 30 sys_shmat function call, No. 31 sys_shmctl function call, No. 9 sys_mmap function call.

For file processing: in this embodiment, monitoring all file processing related system calls is added in syscall_entry function, such as sys_open (2), sys_stat (4), sys_Istat (6), sys_access (21), sys_execve (59), sys_statfs (137), sys_setxattr (188), sys_lsetxattr (189), sys_getxattr (191), sys_lgetxattr (192), sys_listxattr (195), sys_llistxattr (196), and the content in the brackets is the corresponding Linux system call number, similarly hereinafter. In this way, when the target process opens a file or searches file information, the absolute path of this file is recorded. For process processing: in this embodiment, monitoring sub-process creation related system call is added in syscall_entry function, such as sys_clone (56), sys_fork (57), sys_vfork (58). When a program creates a sub-process, the sub-process can be tracked and the dependencies of the sub-process on the operation system environment can be collected by using the same method of performing tracking execution.

For local inter-process communication processing: when a program interacts with other processes through inter-process communication, it indicates that other processes are required for normally executing this program, i.e., other processes become the dependencies of this program, so it is called program depended process. The dependencies of the depended process is also the dependencies of this program, therefore, these dependencies are also acquired by recursion. The dependencies of the depended process consist of two parts: a) executable program itself of the process; b) dependencies on the operation system when the process is running. The executable program of the process can be acquired through looking up the command line parameter when the process is started. The dependencies on the operation system when the process is running can be acquired by recursively using our iterative tracking process. The processing process of inter-process communication in this embodiment is as follows: monitoring the inter-process communication system call, such as sys_pipe (22), sys_pipe2 (293), sys_kill (62), sys_connect (42), sys_accept (43), sys_recvmmsg (299), sys_sendmmsg (307), when the program communicates with other processes, finding out the pid number of this process; then using the starting parameter of looking up this process (obtaining the command line parameter of the program using ps-aux command under Linux), killing this process, restarting this process in an iterative tracking manner, setting the same command line parameter for this process, consequently to realize tracking of this process, and collect the dependencies of this process.

For processing of kernel object shared between processes (mutex, sharing memory, etc.): another common way of interaction between the process and the outside is sharing the kernel object, such as sharing the memory. If a program shares the memory with other processes during running, then other processes are also the depended processes of this program. The dependencies of the depended process are collected by using the method in 1.4). The processing process of sharing the kernel object between processes is as follows: monitoring the system call created for sharing the kernel object, such as sys_shmat (30), sys_shmctl (31), sys_mmap (9), looking up the process pid of opening the kernel object (looking up pid of opening the kernel object using dtrace under Linux), i.e., depended process; then looking up the command line starting parameter of the depended process by pid; tracking the dependencies depending on the process by the method in 1.4).

In this embodiment, each round of iterative tracking steps will generate a lot of operation system dependency data which are stored in file form. To improve the efficiency and reduce the file volume, a file list required for packaging the target application to a container mirror image is organized and constructed according to the operation system dependencies in step 2). In this embodiment, step 2) comprises the following detailed steps:

2.1) combining all operation system dependencies into one file;

2.2) deleting duplicate items from the combined file; reading the combined dependency file, and deleting the duplicate items. The duplicate items include two cases: the same dependency is tracked in different iterations; the same dependency is tracked in one iteration, for example, the program opens the same file twice.

2.3) deleting non-dependencies from the combined file; the non-dependencies includes new file items to be created in file dependencies of operation system dependencies when the target application is executed in a new container mirror image environment; for example: when the file opened in "w" way is executed in a new environment, the program will create a new file, thus the normal execution of the program do not depend on this file;

2.4) deleting items unnecessarily to be reconstructed in the target container mirror image for file dependencies in operation system dependencies of the combined file, and finally obtaining a file list required for packaging the target application to a container mirror image.

The items unnecessarily to be reconstructed in the target container mirror image include items involving the files under /proc, /dev and /tmp directory. The proc file system in Linux is under /proc directory, and the file in the file system is not a conventional disk file, but it presents the information in Linux kernel in file form, and each Linux kernel has this proc file system, thus, it is unnecessary to copy; the system device file is saved under/dev directory, associated with specific hardware device, thus, it is unnecessary to copy; the temporary files of the system are saved under /tmp directory, not belonging to the program dependencies, thus it is unnecessary to copy.

In this embodiment, step 3) comprises the following detailed steps:

3.1) initializing and creating Dockerfile and container mirror image file creation directory;

3.2) traversing and selecting one of dependencies as the current dependency for the file list required for packaging the target application to a container mirror image;

3.3) Judging the type of the current dependency: if the type of the current dependency is an environment variable, adding one statement of setting the environment variable of the current dependency in Dockerfile; if the type of the current dependency is a file, creating a same directory structure as the original directory structure of the file of the current dependency under the container mirror image file creation directory, and copying the file of the current dependency to the same directory structure under the container mirror image file creation directory; if the type of the current dependency is a symbolic link, recursively traverse the file pointed by the symbolic link until the file pointed finally by the link is a conventional file, reconstructing a completely same symbolic link structure in Dockerfile according to the pointing relations between symbolic links, and creating a same directory structure as the original directory structure of the file pointed finally by the symbolic link under the container mirror image file creation directory, then copying the file pointed finally by the symbolic link to the same directory structure under the container mirror image file creation directory; for example, if the original file is /usr/lib/xxx.so, creating a same directory structure under docker build directory, and then copying xxx.so to the corresponding directory, such as docker_build/usr/lib/xxx.so, if the dependency is an environment variable, it is necessary to add "ENV xxx" in Dockerfile, wherein xxx is the set environment variable; if the dependency is a symbolic link, it is necessary to reconstruction a completely same symbolic link structure in docker container. For example, if the dependency is a symbolic link a, the pointing relation is a→b→c→d, wherein a, b, c are symbolic links, and d is a conventional file. The way of processing a symbolic link is: recursively traversing the pointed file, until the final pointing is the conventional file. The finally pointed conventional file is processed according to the way of common file dependency, i.e., copying to docker build directory according to the directory structure. For each symbolic link obtained in the traversing process, "RUN ln-sf [s] [d]" command is added in DockerFile, so as to create a same symbolic link in the container, consequently to convert the current dependencies into Dockerfile and container mirror image finally;

3.4) Judging whether the file list required for packaging the target application to a container mirror image is traversed, if not, traversing and selecting the next item as the current item, and jumping to step 3.3); otherwise ending and exiting.

This embodiment further provides a container mirror image quick generation method, comprising the following implementation steps:

S1) For the target application, generating a Dockerfile and container mirror image file creation directory used for packaging the target application to the container mirror image by using the container Dockerfile quick generation method of this embodiment;

S2) Based on the existing basic container mirror image, generating a container mirror image on the target host from Dockerfile and container mirror image file creation directory through docker build command, consequently to package the target application to the container mirror image.

This embodiment further provides a container mirror image quick generation system, comprising a computer system, wherein the computer system is programmed to perform the steps of the container Dockerfile quick generation method or the steps of the container mirror image quick generation method in this embodiment.

To sum up, the embodiment performs tracking execution by comprehensively using a binary program, and analyzes the complex dependency in the running process so that a specific application completes a real execution in an environment monitored transparently. Then, according to analysis for the dependency of the specific application on each library, data and other executable programs in the system during the real execution, the specific application automatically organizes and generates all files required by construction of the container mirror image, and automatically generates Dockerfile scripts, consequently to package the specific application in a container mirror image. Due to the complexity of interaction with the operation system and other processes in the system when the process is running, this automated packaging process cannot complete the packaging task through extracting the file name opened by this process. The patent completely considers various possible interaction behaviors of a process in the system, and completes construction of an executable minimal environmental closure of the target application through the tracking process during continuous iterative running.

Embodiment 2

This embodiment is basically the same as the embodiment 1, and the main difference lies in that: step 1 is for single target application, while the container Dockerfile quick generation method of this embodiment is for multiple target applications; for multiple target applications, the step 1) includes traversing multiple target application, step 2) and the step 3) are completely the same, so that the executable minimal environmental closure of multiple target applications can be completed.

The above are only preferred embodiments of the present invention, and the protection scope of the present invention is not limited to the embodiment mentioned above. The technical solutions under the ideas of the present invention fall into the protection scope of the present invention. It should be pointed out that, for an ordinary person skilled in the art, some improvements and modifications without departing from the principle of the present invention shall be deemed as the protection scope of the present invention.

What is claimed is:
1. A container Dockerfile quick generation method, comprising:

step 1) running a target application to be packed, performing a program tracking mode for the target application, and recording operation system dependencies of the target application while running the target application in an operation system, wherein the program tracking mode for the target application is one of a dynamic binary translation and a dynamic link library hijack;

step 2) organizing and constructing a file list required for packaging the target application to a container mirror image according to the operation system dependencies; and step 3) generating a Dockerfile and a file creation directory of the container mirror image used for packaging the target application to the container mirror image according to the file list required for packaging the target application to the container mirror image, wherein the step 1) comprises:

step 1.1) isolating the target application to be packed in an independent process space of the operation system, initially generating running parameters of the target application and running the target application based on the running parameters and iteratively performing a round of the program tracking mode for the target application, wherein system calls in the independent process space of the operation system is a sole channel for the target application interacted with outside, and all of the system calls of the target application are monitored;

step 1.2) collecting environment variables and environment variable values required for running the target application and adding environment variable dependencies to the operation system dependencies while running the target application;

step 1.3) monitoring the system calls while running the target application, wherein types of the system calls comprise a system call for files, a system call for process creating, a system call for local inter-process communication, and a system call for sharing kernel objects, wherein the system calls comprise an executive body, and the executive body comprises the target application, a process created by the target application through the system call for process creating, and a process restarted by the target application after the target application performs the system call for local inter-process communication and the system call for sharing kernel objects, wherein when the target application performs the system call for local inter-process communication and the system call for sharing kernel objects, acquiring starting parameters of a called process, killing the called process and restarting the called process based on the acquired starting parameters by the program tracking mode, and recording file dependencies of the operation system dependencies, process dependencies of the operation system dependencies, and communication process dependencies of the operation system dependencies, wherein the file dependencies of the operation system dependencies are related to the files corresponding to the system call for the files, the process dependencies of the operation system dependencies are related to the process created by the target application through the system call for process creating, and the communication process dependencies of the operation system dependencies are related to the process the system call for local inter-process communication and the system call for sharing kernel objects;

step 1.4) judging whether the target application ends operation or an operation time of the target application exceeds a preset time threshold;

step 1.5) judging whether the operation system dependencies obtained by performing the round of the program tracking mode for the target application are added new dependencies of the operation system dependencies in response to the target application ends the operation or the operation time of the target application exceeds the preset time threshold, changing the running parameters of the target application, running the target application based on the changed running parameters and iteratively performing a next round of the program tracking mode for the target application to jump to the step 1.2) in response to the operation system dependencies are added the new dependencies of the operation system dependencies; and jumping to the step 2) in response to the operation system dependencies are not added the new dependencies of the operation system dependencies.

2. The container Dockerfile quick generation method as recited in claim 1, wherein collecting the environment variables and the environment variable values required for running the target application in the step 1.2) further refers to:

recording current visible environment variables and current visible environment variable values before running the target application as the environment variable dependencies in the operation system dependencies.

3. A container mirror image quick generation method, comprising:

step S1) generating a Dockerfile and a file creation directory of a exist basic container mirror image used for packaging a second target application to the container mirror image according to the container Dockerfile quick generation method as recited in claim 2; and step S2) generating the exist basic container mirror image on a target host from the Dockerfile and the file creation directory of the exist basic container mirror image through docker build command, consequently to package the second target application to the generated exist basic container mirror image on the target host.

4. A container mirror image quick generation system, comprising a computer system having, at least one processor, wherein the at least one processor is programmed to perform the container Dockerfile quick generation method as recited in claim 2.

5. The container Dockerfile quick generation method as recited in claim 1, wherein the system call for files in the step 1.3) comprises:

a sys_open function call, a sys_stat function call, a sys_lstat function call, a sys_access function call, a sys_execve function call, a sys_statfs function call, a sys_setxattr function call, a sys_lsetxattr function call, a sys_getxattr function call, a sys_lgetxattr function call, a sys_listxattr function call, and a sys_llistxattr function call;

wherein the system call for process creating in the step 1.3) comprises: a sys_clone function call, a sys_fork function call, and a sys_vfork function call;

wherein the system call for local inter-process communication in the step 1.3) comprises: a sys_pipe function call, a sys_pipe2 function call, a sys_kill function call, a sys_connect function call, a sys_accept function call, a sys_recvmmsg function call, and a sys_sendmmsg function call;

wherein the system call for sharing kernel objects in the step 1.3) comprises: a sys_shmat function call, a sys_shmal function call, and a sys_mmap function call.

6. A container mirror image quick generation method, comprising:

step S1) generating a Dockerfile and a file creation directory of a exist basic container mirror image used for packaging a second target application to the container mirror image according to the container Dockerfile quick generation method as recited in claim 5; and step S2) generating the exist basic container mirror image on a target host from the Dockerfile and the file creation directory of the exist basic container mirror image through docker build command, consequently to package the second target application to the generated exist basic container mirror image on the target host.

7. The container Dockerfile quick generation method as recited in claim 1, wherein the step 2) comprises:

step 2.1) combining all of the operation system dependencies into a combined file;

step 2.2) deleting duplicate items from the combined file;

step 2.3) deleting non-dependencies from the combined file, wherein the non-dependencies comprise file items to be newly created in the file dependencies of the operation system dependencies when the target application is executed in a new container mirror image environment; and step 2.4) deleting items unnecessarily to be reconstructed in the container mirror image for the file dependencies of the operation system dependencies of the combined file, and obtaining the file list required for packaging the target application to the container mirror image.

8. A container mirror image quick generation method, comprising:

step S1) generating a Dockerfile and a file creation directory of a exist basic container mirror image used for packaging a second target application to the container mirror image according to the container Dockerfile quick generation method as recited in claim 7; and step S2) generating the exist basic container mirror image on a target host from the Dockerfile and the file creation directory of the exist basic container mirror image through docker build command, consequently to package the second target application to the generated exist basic container mirror image on the target host.

9. The container Dockerfile quick generation method as recited in claim 1, wherein the step 3) comprises:

step 3.1) initially creating the Dockerfile and the file creation directory of the container mirror image;

step 3.2) traversing and selecting one of the operation system dependencies as a current dependency for the file list required for packaging the target application to the container mirror image; and step 3.3) judging a type of the current dependency:

wherein adding one statement of setting the environment variables of the current dependency in the Dockerfile in response to the type of the current dependency is the environment variables; wherein creating a same directory structure as a original directory structure of a file of the current dependency under the file creation directory of the container mirror image, and copying the file of the current dependency to the same directory structure under the file creation directory of the container mirror image in response to the type of the current dependency is a file type;

wherein recursively traversing a file pointed by a symbolic link until the file pointed by the link is a conventional file, reconstructing a completely same symbolic link structure in the Dockerfile according to pointing relations between symbolic links, and creating a same directory structure as the original directory structure of the file pointed by the symbolic link under the file creation directory of the container mirror image, then copying the file pointed by the symbolic link to the same directory structure under the file creation directory of the container mirror image in response to the type of the current dependency is a symbolic link;

step 3.4) judging whether the file list required for packaging the target application to the container mirror image is traversed; wherein traversing and selecting a next item as a current item, and jumping to the step 3.3) in response to the file list required for packaging the target application to the container mirror image is not traversed; wherein ending and exiting the container Dockerfile quick generation method in response to the file list required for packaging the target application to the container mirror image is traversed.

10. A container mirror image quick generation method, comprising:

step S1) generating a Dockerfile and a file creation directory of a exist basic container mirror image used for packaging a second target application to the container mirror image according to the container Dockerfile quick generation method as recited in claim 9; and step S2) generating the exist basic container mirror image on a target host from the Dockerfile and the file creation directory of the exist basic container mirror image through docker build command, consequently to package the second target application to the generated exist basic container mirror image on the target host.

11. A container mirror image quick generation method, comprising:

step S1) generating a Dockerfile and a file creation directory of a exist basic container mirror image used for packaging a second target application to the container mirror image according to the container Dockerfile quick generation method as recited in claim 1; and step S2) generating the exist basic container mirror image on a target host from the Dockerfile and the file creation directory of the exist basic container mirror image through docker build command, consequently to package the second target application to the generated exist basic container mirror image on the target host.

12. A container mirror image quick generation system, comprising at least one processor of a computer system, wherein the at least one processor of the computer system is programmed to perform the steps of the container Dockerfile quick generation method as recited in claim 1.

13. A container mirror image quick generation method, comprising:

step S1) generating a Dockerfile and a file creation directory of a exist basic container mirror image used for packaging a second target application to the container mirror image according to the container Dockerfile quick generation method as recited in claim 1; and step S2) generating the exist basic container mirror image on a target host from the Dockerfile and the file creation directory of the exist basic container mirror image through docker build command, consequently to package the second target application to the generated exist basic container mirror image on the target host.

14. A container mirror image quick generation system, comprising a computer system having, at least one processor, wherein the at least one processor is programmed to perform the container Dockerfile quick generation method as recited in claim 1.

15. The container Dockerfile quick generation method as recited in claim 1, wherein collecting the environment variables and the environment variable values required for running the target application in the step 1.2) further refers to:

calling a function of monitoring getenv standard library functions during execution of the target application, recording the called function of the monitoring getenv standard library functions while running the target application to obtain the environment variables and the environment variable values as the environment variable dependencies in the operation system dependencies.

* * * * *